W. E. HELIN.
ATTACHMENT FOR DISKS.
APPLICATION FILED JUNE 7, 1915.
1,155,657.
Patented Oct. 5, 1915.
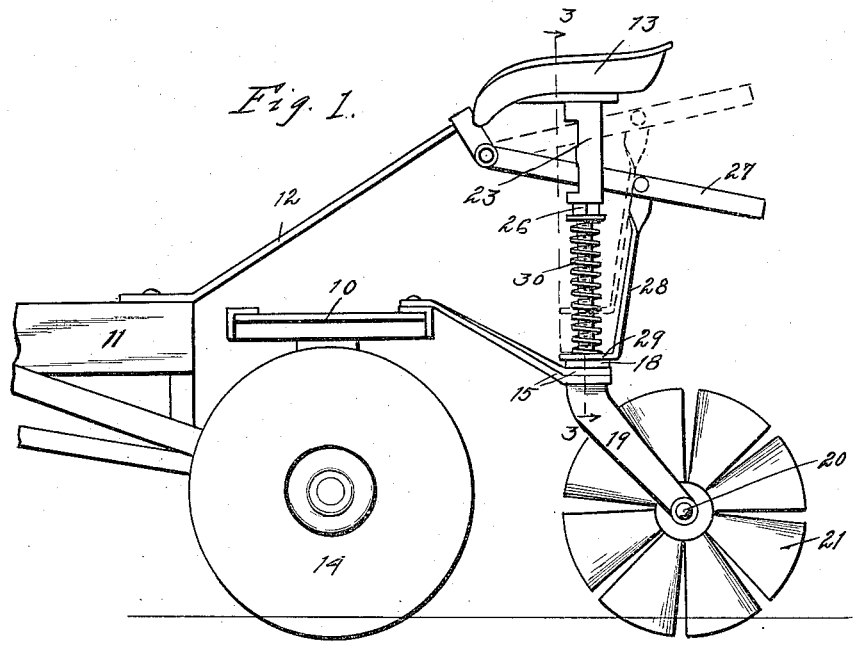
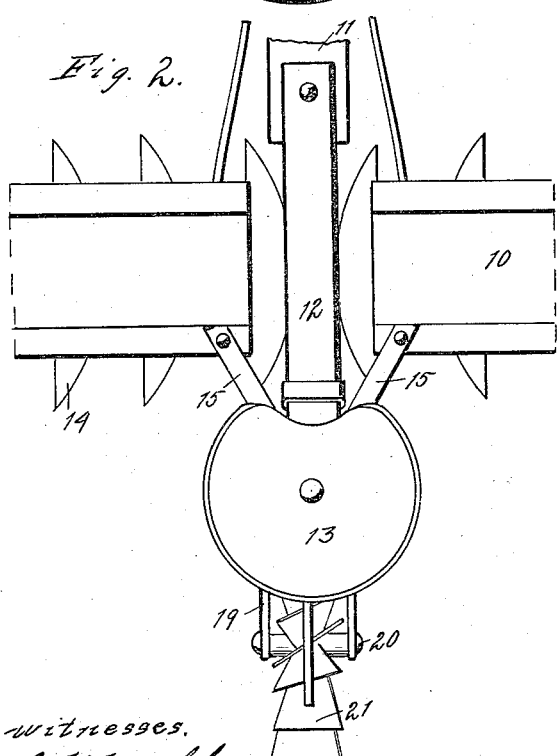
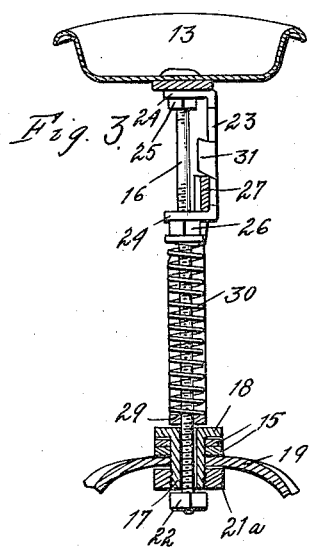
Witnesses.
G. F. Turechek.
Inventor
Wilber E. Helin
By Orwig + Bair
Attys.

UNITED STATES PATENT OFFICE.

WILBER E. HELIN, OF STATE CENTER, IOWA.

ATTACHMENT FOR DISKS.

1,155,657.   Specification of Letters Patent.   Patented Oct. 5, 1915.

Application filed June 7, 1915.   Serial No. 32,790.

*To all whom it may concern:*

Be it known that I, WILBER E. HELIN, a citizen of the United States, and resident of State Center, in the county of Marshall and State of Iowa, have invented a certain new and useful Attachment for Disks, of which the following is a specification.

The object of my invention is to provide an attachment for disks of simple, durable and inexpensive construction, adapted to cultivate the ridge of land ordinarily left between the two series of disk blades.

A further object is to provide such an attachment so constructed and arranged that the weight of the driver may be imposed thereon with yielding pressure for forcing the cutting blade of said attachment into the ground, and so that the weight of the driver may be entirely removed from the cutting member so that the latter may run free.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a disk cultivator equipped with an attachment embodying my invention. Fig. 2 shows a top or plan view of the central portion of the disk cultivator, illustrating the relative position of my attachment, and Fig. 3 shows a vertical, sectional view, taken on the line 3—3 of Fig. 1.

In the accompanying drawings I have illustrated one form of my invention, and have employed the reference numeral 10 to indicate generally the frame of an ordinary disk cultivator having the tongue member 11 upon which is fixed an upwardly and rearwardly extending spring support 12 for a seat 13. Suitably mounted on the frame 10 are a plurality of disk blades 14, which it is well known, are ordinarily arranged for the disks on each side of the center of the machine to throw dirt outwardly, as illustrated in Fig. 2. When the disk blades 14 are so arranged a ridge of uncultivated soil is left along the center of the path of travel of the cultivator. It is my purpose, as hereinbefore set forth, to provide an attachment which will loosen, cultivate and level this ridge of soil.

My improved attachment comprises a pair of bars or arms 15 secured to the disk frame 10 on each side of the longitudinal medium line through the machine and converging rearwardly toward each other. The rear ends of the arms 15 may be arranged to overlap, as shown in Fig. 3.

Secured to the rear end of the spring member 12 is a downwardly extending rod 16 on the lower end of which is mounted a sleeve 17 having at its upper end an annular flange 18. The lower ends of the arms 15 are mounted on the upper portion of the sleeve 17 just below the flange 18. Mounted on said sleeve 17 below the members 15 is a central portion of a fork 19. Mounted on the lower end of the fork 19 is an axle 20 on which is mounted a cutting wheel 21 preferably comprising a series of blades, as shown, arranged somewhat like the fan of an ordinary windmill wheel.

On the lower end of the sleeve 17 is a nut $21^a$, and on the lower end of the rod 16 is screwed a nut 22 below the sleeve 17. The parts are arranged so that the rod 16 slides freely through the sleeve 17.

At the upper end of the rod 16 is an upright bar 23 having at its ends parallel lateral extensions 24, through which the rod 16 extends. The nut 25 is screwed on to the rod 16 just below the upper extension 24, and a similar nut 26 is screwed on to the rod 16 just below the lower extension 24.

Mounted on the spring 12 and extending rearwardly therefrom between the rod 16 and the bar 23 is a lever 27. Pivoted to the lever 27 is a downwardly extending arm 28 having at its lower end a lateral extension 29 through which the rod 16 is slidably extended. On the rod 16 between the nut 26 and the extension 29 is a coil spring 30. Formed on the bar 23 is a member 31 extending toward the rod 16 and so arranged that the lever 27 may be moved to position below the extension 31 or may be raised to position above it where said lever will be held by said extension resting upon the upper portion of the extension, as illustrated by the dotted lines in Fig. 1.

In the practical operation of my improved attachment for disks, when the lever 27 is in its lower position, as illustrated by full lines in Fig. 1, the parts stand in such position that the cutting blades 21 tend to cut the ground to about the same depth as do the disk blades 14. The weight of the driver is imposed upon the axle 20 for forcing the cutting blades 21 into the ground from the bar 23 and the extensions 24, the nut 26, the spring 30, the extension 29, the flange 18, the members 15 and the arch or yoke 19. It will thus be seen that the parts are also so arranged that when the lever 21 is raised to its upper limit of movement and is held there by means of the extension 31, the spring 30 is contracted so that the weight of the driver on the seat 13 is imposed on the spring 12, but no weight is imposed on the axle 20 and the blades 21 will therefore simply travel smoothly over the ground without cutting any deeper than will be done by the weight of the parts.

It will be understood that some changes may be made in the arrangement and construction of the parts of my improved attachment without departing from its essential features and purposes and it is my intention to cover by this application any such changes which may be included within the scope of my invention.

I claim as my invention:

1. In a device of the class described, the combination of a disk cultivator having a frame, a spring supporting member mounted on said disk cultivator, an upright member mounted on said supporting member, a rotary cutting member slidably mounted on said upright member, a spring interposed between said cutting member and said supporting member, and means for moving said spring to position where it imparts no pressure to said rotary cutting member.

2. In a device of the class described, the combination of a disk cultivator having a frame, a spring supporting member mounted on the disk cultivator, a seat mounted on said supporting member, an upright member fixed with relation to said supporting member and extending from the rear end thereof, guide members secured to said frame and arranged to slidably receive said upright member, a rotary cutting member slidably mounted on said upright member, a spring interposed between said rotary cutting member and said supporting member, and means mounted on said supporting member for moving said spring to position where it imposes no pressure on said cutting member.

3. In a device of the class described, the combination of a disk cultivator having a frame, a spring supporting member mounted on the disk cultivator, a seat mounted on said supporting member, an upright member fixed with relation to said supporting member and extending from the rear end thereof, a sleeve on the lower portion of said upright member, a brace guide member mounted on said frame and having said sleeve extended through it, a yoke rotatably mounted on said sleeve, a rotary cutting member mounted on said yoke, an upright member having lateral extensions mounted on the upper portion of said upright member, a lever pivoted on said spring supporting member and extended between said upright members, an engaging portion on said second upright member adapted to engage said lever and to hold it in its raised position, a downwardly extending member pivoted to said lever, an extension on the lower end of said downwardly extending member slidably mounted on said upright member, a coil spring mounted on said upright member between said last named extension and the lower extension of said second upright member, said first upright member being arranged to slide in said sleeve so that when said lever is in one position of its movement weight imposed on said spring supporting member will be imposed on said rotary cutting member, while when said spring is raised and held in its upper position said spring will be contracted and weight imposed on the spring supporting member will not be imposed on said rotary cutting member.

Des Moines, Iowa, May 28, 1915.

WILBER E. HELIN.

Witnesses:
J. E. METCHUM,
J. B. Z. COFFMAN.

Copies of this patent may be obtained for five cents each, by addressing the "Commissioner of Patents, Washington, D. C."